US012679648B2

(12) United States Patent　　　(10) Patent No.:　US 12,679,648 B2
Konagaya et al.　　　　　　　　　(45) Date of Patent:　　　Jul. 14, 2026

(54) ARTICLE TRANSPORT FACILITY

(71) Applicant: Daifuku Co., Ltd., Osaka (JP)

(72) Inventors: Toru Konagaya, Hinocho (JP); Akira Takeuchi, Hinocho (JP); Daiki Takagi, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 354 days.

(21) Appl. No.: 18/588,102

(22) Filed: Feb. 27, 2024

(65) Prior Publication Data

US 2024/0286835 A1　　Aug. 29, 2024

(30) Foreign Application Priority Data

Feb. 28, 2023　　(JP) ................................. 2023-029287

(51) Int. Cl.
B65G 1/137　　　　(2006.01)
B65G 1/04　　　　(2006.01)
B65G 1/06　　　　(2006.01)

(52) U.S. Cl.
CPC ........... B65G 1/0492 (2013.01); B65G 1/065 (2013.01); B65G 2207/40 (2013.01)

(58) Field of Classification Search
CPC .. B65G 1/0492; B65G 1/065; B65G 2207/40; B65G 1/1378; B65G 1/137; B65G 1/1373
See application file for complete search history.

(56) References Cited

U.S. PATENT DOCUMENTS

2006/0032685 A1* 2/2006 Koide .................. B65G 1/0485
　　　　　　　　　　　　　　　　　　180/168
2024/0002154 A1* 1/2024 Namazue ............. B65G 1/0407

FOREIGN PATENT DOCUMENTS

| CN | 105438707 A | * | 3/2016 | ........... B65G 1/1373 |
| CN | 110603209 A | * | 12/2019 | ........... B65G 1/0407 |
| JP | 2010058904 A | * | 3/2010 | |
| JP | 2016113291 A | | 6/2016 | |

* cited by examiner

*Primary Examiner* — Justin Holmes
(74) *Attorney, Agent, or Firm* — The Webb Law Firm

(57)　　　　　ABSTRACT

When a second area is set to a travel prohibition area, a control device prohibits a transport vehicle from traveling in the second area but allows the transport vehicle to travel in a first area and a third area. While travel in the second area is prohibited, the transport vehicle moves between the first area and the third area via a second connection route on a second travel floor.

5 Claims, 7 Drawing Sheets

ARTICLE TRANSPORT FACILITY

CROSS-REFERENCE TO RELATED APPLICATION

This application claims priority to Japanese Patent Application No. 2023-029287 filed Feb. 28, 2023, the disclosure of which is hereby incorporated by reference in its entirety.

BACKGROUND OF THE INVENTION

1. Field of the Invention

The present invention relates to an article transport facility provided with a transport vehicle that transports articles.

2. Description of Related Art

Such an article transport facility is often used in a logistic system. For example, JP 2016-113291A (Patent Document 1) discloses a sorting apparatus for sorting articles in a logistic system. Hereinafter, the reference signs given in the parentheses in "Description of the Related Art" correspond to those used in Patent Document 1.

The sorting apparatus (10) disclosed in Patent Document 1 includes an upper area (A) and a lower area (B). The upper area (A) includes: a travel route (4) extending in a planar manner; a transport vehicle (12) that automatically travels on the travel path (4); an article supply section (6); and a plurality of openings (8a). In the upper area (A), the transport vehicle (12) transports articles supplied from the article supply section (6) to a designated opening (8a), and drops the articles thereinto. The articles dropped into the opening (8a) are received in a shipment container (20) disposed in the lower area (B), and are sorted.

Meanwhile, in the facility disclosed in Patent Document 1, particularly when maintenance is to be performed in the upper area (A) in which the transport vehicle (12) is traveling, workers may enter the upper area (A). In this case, in order to avoid contact between the workers and the transport vehicle (12), it is desirable that the travel of the transport vehicle (12) be prohibited. Here, it is conceivable to prohibit the travel of the transport vehicle (12) in the whole upper area (A), but to avoid transport of articles from becoming completely impossible, a measure is also conceivable in which the upper area (A) is divided into a plurality of areas, and the travel of the transport vehicle (12) is prohibited only in the area that the workers have entered but is allowed in other areas. With this, the transport of articles can be continued in the areas of the upper area (A) in which no maintenance is being performed, and the facility can be partially operated.

However, for example, if one of the plurality of divided areas of the upper area (A) located in the center is defined as a travel prohibition area, the transport vehicle (12) can neither travel in the travel prohibition area nor move between areas on both sides of the travel prohibition area. That is to say, there may be cases where, depending on the positional relationship between the travel prohibition area and other areas, the transport vehicle (12) may not be able to move properly.

SUMMARY OF THE INVENTION

In view of the foregoing circumstances, there is a demand for realizing a technique that allows a transport vehicle to move properly between a plurality of areas other than a travel prohibition area.

The technique for solving the above-described problem is as follows.

An article transport facility includes:

a transport vehicle configured to transport articles;

a first travel floor and a second travel floor on which the transport vehicle is travelable;

a plurality of lifters configured to lift and lower the transport vehicle between the first travel floor and the second travel floor; and a control device configured to control transport of the articles, wherein the plurality of lifters include a first lifter, a second lifter, a third lifter, a fourth lifter, a fifth lifter, and a sixth lifter that are horizontally spaced from each, the article transport facility includes, on the first travel floor, a first travel route connecting the first lifter and the second lifter, a second travel route connecting the third lifter and the fourth lifter, a third travel route connecting the fifth lifter and the sixth lifter, and a first connection route, the first travel route, the second travel route, and the third travel route being arranged in parallel, and the first connection route including a section connecting the first travel route and the second travel route, and a section connecting the second travel route and the third travel route, the article transport facility includes, on the second travel floor, a fourth travel route connecting the first lifter and the second lifter, a fifth travel route connecting the third lifter and the fourth lifter, a sixth travel route connecting the fifth lifter and the sixth lifter, and a second connection route, the fourth travel route, the fifth travel route, and the sixth travel route being arranged in parallel, and the second connection route including a section connecting the fourth travel route and the fifth travel route, and a section connecting the fifth travel route and the sixth travel route, the article transport facility has, on the first travel floor, a first area that includes the first travel route but does not include the second travel route and the third travel route, a second area that includes the second travel route but does not include the first travel route and the third travel route, and a third area that includes the third travel route but does not include the first travel route and the second travel route, the control device is configured to be able to set each of the first area, the second area, and the third area to a travel prohibition area in which travel of the transport vehicle is prohibited, in response to the first area being set to the travel prohibition area, the control device prohibits the transport vehicle from traveling in the first area but allows the transport vehicle to travel in the second area and the third area, in response to the third area being set to the travel prohibition area, the control device prohibits the transport vehicle from traveling in the third area but allows the transport vehicle to travel in the first area and the second area, in response to the second area being set to the travel prohibition area, the control device prohibits the transport vehicle from traveling in the second area but allows the transport vehicle to travel in the first area and the third area, and while the transport vehicle is prohibited from traveling in the second area, the transport vehicle moves between the first area and the third area via the second connection route on the second travel floor.

With this configuration, even if any one of the first area, the second area, and the third area provided on the first travel floor is set to a travel prohibition area, it is possible to realize the movement of the transport vehicle between two other areas. That is to say, when the first area is set to the travel prohibition area, the transport vehicle can move between the second area and the third area via the first connection route. When the third area is set to the travel prohibition area, the transport vehicle can move between the first area and the second area via the first connection route. Also, when the second area located in the center is set to the travel prohibition area, the transport vehicle can move between the first area and the third area via the second connection route on the second travel floor. Accordingly, this configuration enables a transport vehicle to appropriately move between a plurality of areas other than a travel prohibition area.

Further features and advantages of the technique according to the present disclosure will become apparent from the following description of exemplary and non-limiting embodiments given with reference to the drawings.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

The following will describe an embodiment of an article transport facility with reference to the drawings.

Figure 1:
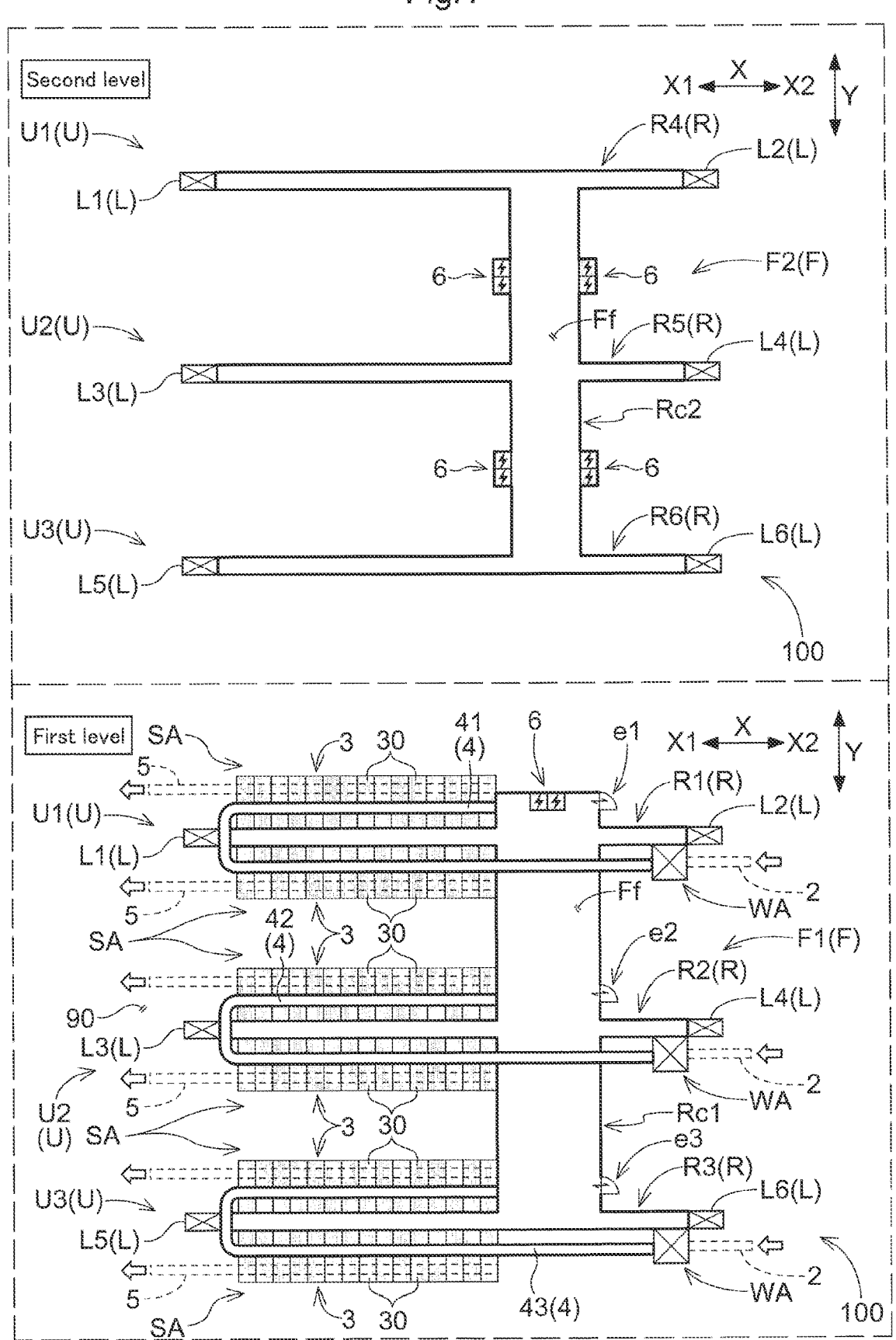
FIG. 1 is a plan view illustrating a first travel floor and a second travel floor of an article transport facility.

As shown in FIG. 1, an article transport facility 100 includes: a transport vehicle 1 (see FIG. 2) that transports articles G; a first travel floor F1 and a second travel floor F2 on which the transport vehicle 1 is travelable; and a plurality of lifters L that lift and lower the transport vehicle 1 between the first travel floor F1 and the second travel floor F2. The first travel floor F1 is a travel floor F at a first level. The second travel floor F2 is a travel floor F at a second level higher than the first level. In an example shown in FIG. 1, "first floor" corresponds to the first level, and "second floor" corresponds to the second level. The second level may also be a level lower than the first level. Hereinafter, the first travel floor F1 and the second travel floor F2 may be collectively referred to as "travel floors F" when they are not particularly distinguished from each other.

The plurality of lifters L include a first lifter L1, a second lifter L2, a third lifter L3, a fourth lifter L4, a fifth lifter L5, and a sixth lifter L6, which are horizontally spaced from each other. Hereafter, these lifters may be collectively referred to as "lifters L" when they are not particularly distinguished from each other.

On the first travel floor F1, a first travel route R1 that connects the first lifter L1 and the second lifter L2, a second travel route R2 that connects the third lifter L3 and the fourth lifter L4, and a third travel route R3 that connects the fifth lifter L5 and the sixth lifter L6 are arranged in parallel, and a first connection route Rc1 includes a section connecting the first travel route R1 and the second travel route R2, and a section connecting the second travel route R2 and the third travel route R3. The transport vehicle 1 can move between the first travel route R1, the second travel route R2, and the third travel route R3, by travel along the first connection route Rc1.

On the second travel floor F2, a fourth travel route R4 that connects the first lifter L1 and the second lifter L2, a fifth travel route R5 that connects the third lifter L3 and the fourth lifter L4, and a sixth travel route R6 that connects the fifth lifter L5 and the sixth lifter L6 are arranged in parallel, and a second connection route Rc2 includes a section connecting the fourth travel route R4 and the fifth travel route R5, and a section connecting the fifth travel route R5 and the sixth travel route R6. The transport vehicle 1 can move between the fourth travel route R4, the fifth travel route R5, and the sixth travel route R6, by traveling along the second connection route Rc2.

Hereinafter, the first travel route R1, the second travel route R2, the third travel route R3, the fourth travel route R4, the fifth travel route R5, and the sixth travel route R6 may be collectively referred to as "travel routes R" when they are not particularly distinguished from each other.

In the present embodiment, the first travel route R1, the second travel route R2, the third travel route R3, the fourth travel route R4, the fifth travel route R5, and the sixth travel route R6 are arranged in parallel to each other. Hereinafter, a direction in which these travel routes R extend is defined as "route extension direction X", and a direction that is orthogonal to the route extension direction X when viewed in an up-down direction is defined as "route width direction Y". Also, one side in the route extension direction X is defined as a "first side X1 in the route extension direction" and the other side is defined as a "second side X2 in the route extension direction".

The first travel route R1, the second travel route R2, and the third travel route R3 are arranged in parallel to each other in the route width direction Y. The first connection route Rc1 extends in the route width direction Y, and connects the first travel route R1, the second travel route R2, and the third travel route R3.

The fourth travel route R4, the fifth travel route R5, and the sixth travel route R6 are arranged in parallel to each other in the route width direction Y. The second connection route Rc2 extends in the route width direction Y, and connects the fourth travel route R4, the fifth travel route R5, and the sixth travel route R6.

In the present embodiment, the first lifter L1 is disposed on the first side X1 in the route extension direction relative to the second lifter L2. In this example, the first lifter L1 is connected to an end of each of the first travel route R1 and the fourth travel route R4 on the first side X1 in the route extension direction, and the second lifter L2 is connected to an end of each of the first travel route R1 and the fourth travel route R4 on the second side X2 in the route extension direction.

In the present embodiment, the third lifter L3 is disposed on the first side X1 in the route extension direction relative to the fourth lifter L4. In this example, the third lifter L3 is connected to an end of each of the second travel route R2 and the fifth travel route R5 on the first side X1 in the route extension direction, and the fourth lifter L4 is connected to an end of each of the second travel route R2 and the fifth travel route R5 on the second side X2 in the route extension direction.

In the present embodiment, the fifth lifter L5 is disposed on the first side X1 in the route extension direction relative to the sixth lifter L6. In this example, the fifth lifter L5 is connected to an end of each of the third travel route R3 and the sixth travel route R6 on the first side X1 in the route extension direction, and the sixth lifter L6 is connected to an end of each of the third travel route R3 and the sixth travel route R6 on the second side X2 in the route extension direction.

In the present embodiment, the first lifters L1 and the second lifters L2, and the first travel route R1 and the fourth travel route R4 that connect these lifters L on the corresponding travel floors F constitute a first transport unit U1. Also, the third lifters L3 and the fourth lifters L4, and the second travel route R2 and the fifth travel route R5 that connect these lifters L on the corresponding travel floors F constitute a second transport unit U2. Also, the fifth lifters L5 and the sixth lifters L6, and the third travel route R3 and the sixth travel route R6 that connect these lifters L on the corresponding travel floors F constitute a third transport unit U3. Hereinafter, the first transport unit U1, the second transport unit U2, and the third transport unit U3 may be collectively referred to as "transport units U" when they are not particularly distinguished from each other.

In the present embodiment, article supply sections 2 for supplying articles G (see FIG. 2) to be transported by the transport vehicle 1 are provided. In this example, the article supply sections 2 are only provided on the first travel floor F1. The same number of article supply sections 2 are provided as the number of travel routes R (in this example, the first to third travel routes R1 to R3) provided on the first travel floor F1. Each of the article supply sections 2 is adjacent to the corresponding travel route R.

In the present embodiment, in a space in the up-down direction between the first travel floor F1 and the second travel floor F2, a first conveyor 41 with a section provided between the first travel route R1 and the second travel route R2 and extending along the first travel route R1, and a second conveyor 42 with a section provided between the second travel route R2 and the third travel route R3 and extending along the second travel route R2 are provided. The shown example, besides the first conveyor 41 and the second conveyor 42, a third conveyor 43 with a section extending along the third travel route R3 is provided. These first to third conveyors 41 to 43 are configured as empty container collection conveyors 4 that collect empty containers C resulting from work of sorting articles G, as will be described in detail later. Hereinafter, the first to third conveyors 41 to 43 may be collectively referred to as "empty container collection conveyors 4" when they are not particularly distinguished from each other.

Figure 2:
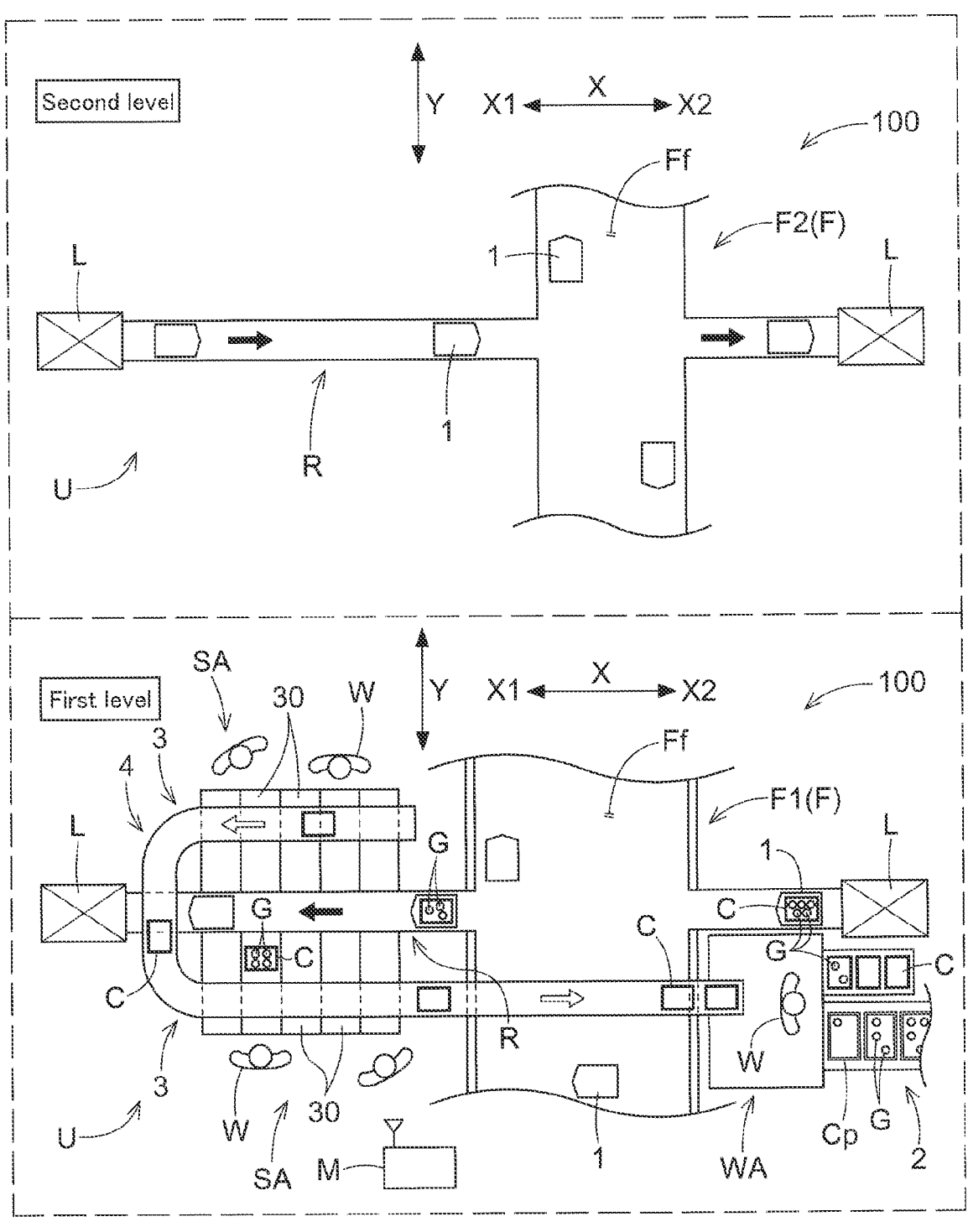
FIG. 2 is a schematic plan view illustrating part of the article transport facility.
Figure 3:
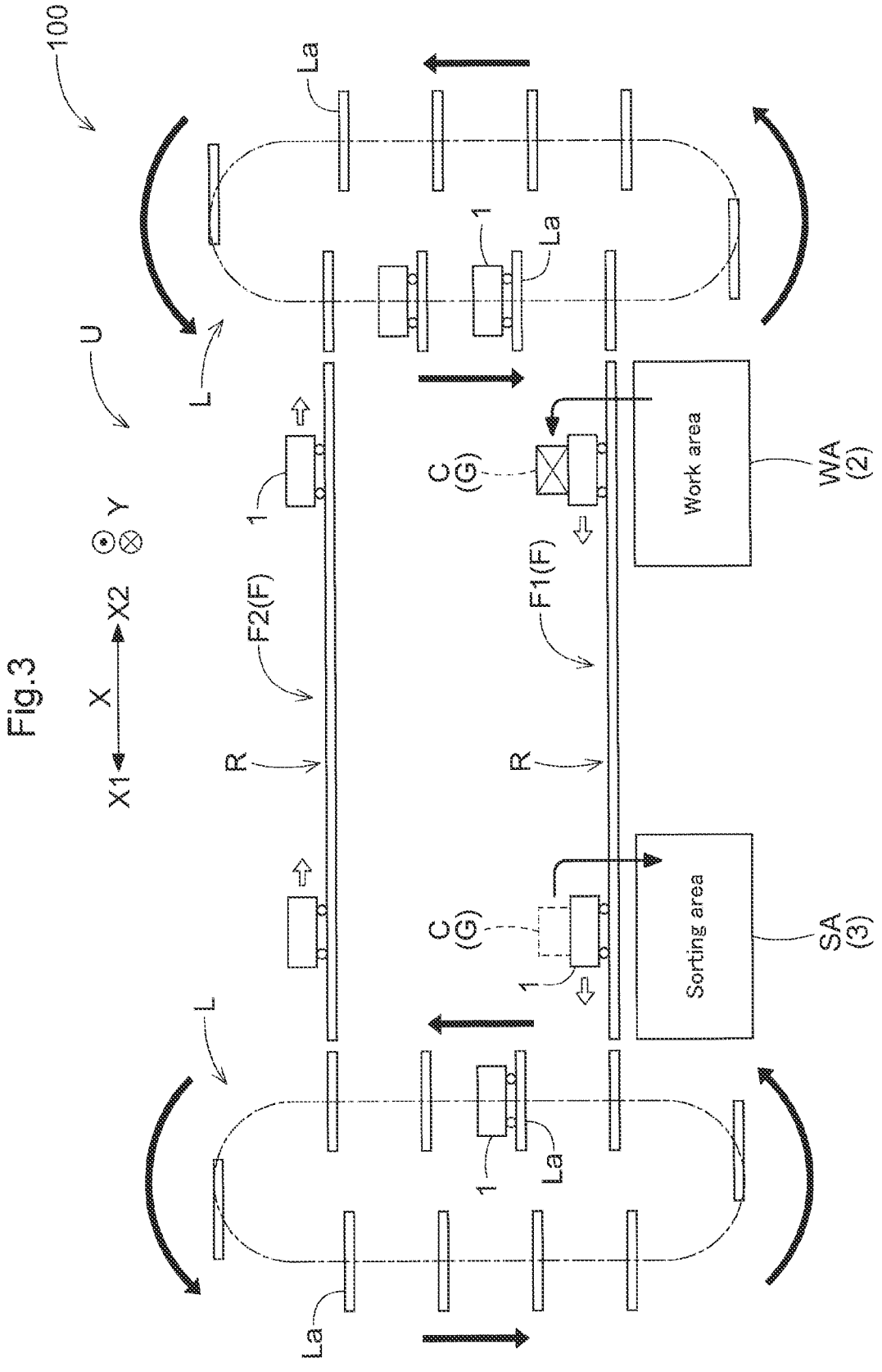
FIG. 3 is a schematic side view illustrating part of the article transport facility.

The following will describe an overall configuration of the article transport facility 100 mainly with reference to FIGS. 2 and 3. FIGS. 2 and 3 are diagrams for use in brief description of an overall configuration of the article transport facility 100. Accordingly, in FIGS. 2 and 3, elements that are not essential for the description of the overall configuration of the article transport facility 100 are omitted, or even elements essential for the description are shown in a simplified manner. Note that FIGS. 2 and 3 show one of the plurality of transport units U.

As shown in FIG. 2, the article transport facility 100 includes travel floors F (in this example, the first travel floor F1 and the second travel floor F2) at a plurality of levels aligned in the up-down direction, and transport vehicles 1 that travel on travel surfaces Ff of the respective travel floors F. On the travel floor F at each level, a plurality of transport vehicles 1 travel on the travel surface Ff.

The article transport facility 100 includes a control device M that controls the transport of articles G. The control device M is configured to control the transport of articles G by controlling the transport vehicles 1. The control device M gives transport instructions, standby instructions and the like to the transport vehicles 1. In a transport instruction, the transport origin and the transport destination of articles G are designated. Upon reception of the transport instruction, the transport vehicle 1 receives the articles G at the designated transport origin and transports the articles G to the designated transport destination. Also, in a standby instruction, a standby location is designated. Upon receiving the standby instruction, the transport vehicle 1 travels to the designated standby location, and stands by there until it receives a next instruction or the like.

The transport vehicle 1 is configured to travel in an unmanned manner. In the present embodiment, the transport vehicle 1 is provided with a battery, and is configured to operate using the power stored in the battery as a driving source. The article transport facility 100 includes charging stations 6 (see FIG. 1). The transport vehicle 1 can be charged at the charging station 6 when the amount of charge of the battery is low.

Although detailed illustrations are omitted, in the present embodiment, position information storage sections that store position information are provided at a plurality of positions on the travel floor F. Each position information storage section stores address information indicating the position where the position information storage section is provided. The transport vehicle 1 is provided with a detection unit (not shown) for detecting any position information storage section, and by using detection unit to detect a position information storage section, the transport vehicle 1 can recognize the current position of the vehicle at the time of detection. The transport vehicle 1 travels toward a desired location while sequentially reading a plurality of position information storage sections. For example, one-dimensional codes or two-dimensional codes that store identification information can be used as the position information storage sections. Alternatively, RFID tags (Radio Frequency Identification Tags) that store identification information can be used as the position information storage sections.

The article transport facility 100 includes article supply sections 2 for supplying articles G to the transport vehicle 1, and article reception sections 3 for receiving articles G transported by the transport vehicle 1. Also, a work area WA is provided at a position adjacent to each of the article supply sections 2. In the work area WA, work to deliver the articles G supplied from the article supply section 2 to the transport vehicle 1 is performed. Also, a sorting area SA is provided at a position adjacent to each of the article reception sections 3. In the sorting area SA, work to sort the articles G received at the article reception section 3 is performed.

In the present embodiment, the article supply sections 2 and the article reception sections 3 are only provided on the first travel floor F1. In other words, the work areas WA and the sorting areas SA are provided only on the first travel floor F1. However, the present invention is not limited to the above-described configuration, and the article supply sections 2 and the article reception sections 3 may be provided on each of the plurality of travel floors F.

The work area WA is adjacent to the corresponding travel route R on the first travel floor F1. That is to say, the same number of work areas WA are provided as the number of travel routes R (in this example, the first to third travel routes R1 to R3 as shown in FIG. 1) provided on the first travel floor F1.

The articles G from the article supply section 2 are supplied to the transport vehicle 1 as is or in a state of being contained in a container C. In the present embodiment, in the article supply section 2, the articles G are supplied to the work area WA in the state in which the articles G are contained in a supply container Cp. In the work area WA, work to remove the articles G contained in the supply container Cp and deliver the articles G to the transport vehicle 1 standing by on the travel route R is performed. That is to say, in the present embodiment, the articles G may be delivered to the transport vehicle 1 while being contained in a container C different from the supply container Cp, or may be delivered as is without being contained in the container C. Through the delivery work, the articles G are supplied to the transport vehicle 1 from the article supply section 2. In the present embodiment, the above-described work in the work area WA is performed by workers W. However, the above-described work may be performed by robots, instead of the workers W, or may be performed by both the workers W and the robots.

The transport vehicle 1 is configured to transport articles G or a container C containing the articles G. The transport vehicle 1 transports the articles G supplied from the article supply section 2, namely in this example, the articles G or the container C containing the articles G received in the work area WA, to the article reception section 3.

The article reception sections 3 are provided at a location apart from the work areas WA, while being adjacent to the respective travel routes R in the route width direction Y. In this example, the article reception sections 3 are provided on the respective sides of the travel route R in the route width direction Y.

In the present embodiment, the article reception section 3 includes a plurality of transport mechanisms 30 lined up in the route extension direction X. The plurality of transport mechanisms 30 are configured to transport the articles G or the container C containing the articles G received from the transport vehicle 1, in the route width direction Y. In this example, the transport mechanism 30 is configured using a conveyor. Note however that the transport mechanism 30 may be configured using a shoot inclined downward and outward in the route width direction Y. When a shoot is used as the transport mechanism 30, the articles G or the container C containing the articles G are transported, with their or its own weights, outward in the route width direction Y.

As described above, the sorting area SA is adjacent to the corresponding article reception section 3. The articles G or the container C containing the articles G transported outward in the route width direction Y by the transport mechanisms 30 of the article reception section 3 are/is transported to the sorting area SA. That is to say, the transport vehicle 1 is configured to transport the articles G or the container C containing the articles G received at the article supply section 2, to the sorting area SA. In this example, the transport vehicle 1 transports, via the transport mechanisms 30 of the article reception section 3, the articles G or the container C containing the articles G received at the article supply section 2, to the sorting area SA.

In the sorting area SA, work to sort the articles G transported by the transport vehicle 1 is performed. The sorting work is performed based on predetermined order information. The order information includes various types of information such as, for example, client information, shipment destination information, and article type information.

In the present embodiment, when the transport vehicle 1 transports articles G contained in a container C to the sorting area SA, the work to remove the articles G from the container C is performed in the sorting area SA. That is to say, the sorting work includes removal work to remove the articles G from the container C transported by the transport vehicle 1. In the present embodiment, the sorting work (including the above-described removal work) in the sorting area SA is performed by workers W. However, the sorting work may be performed by robots, instead of the workers W, or may be performed by both the workers W and the robots.

The articles G sorted in the sorting area SA are discharged to the outside of the sorting area SA by a discharge conveyor 5 (see FIG. 1), and are transported to, for example, a location at which the next process is to be performed.

Due to the removal work in the sorting areas SA, the containers C and the articles G are separated from each other, resulting in empty containers C. In the present embodiment, empty container collection conveyors 4 that collect the empty containers C resulting from the removal work in the sorting areas SA are provided on the travel floor F (in this example, the first travel floor F1) on which the article reception sections 3 are provided. One empty container collection conveyor 4 is provided for each of the plurality of transport units U of the article transport facility 100 (see FIG. 1). The empty container collection conveyor 4 of the first transport unit U1 is the first conveyor 41, the empty container collection conveyor 4 of the second transport unit U2 is the second conveyor 42, and the empty container collection conveyor 4 of the third transport unit U3 is the third conveyor 43.

In the present embodiment, the empty container collection conveyors 4 extend to positions adjacent to the respective work areas WA. In this example, the empty container collection conveyors 4 extend to the inside of the respective work areas WA. The empty containers C collected by the empty container collection conveyors 4 are transported to the work areas WA, and are reused for the work in the work areas WA.

After delivering the articles G to the sorting area SA (article reception section 3) on the first travel floor F1, the transport vehicle 1 rides a lifter L (lifter L on the first side X1 in the route extension direction) to move toward the second travel floor F2. Then, the transport vehicle 1 travels on the second travel floor F2, and rides another lifter L disposed opposite in the route extension direction X to the above-described lifter L (lifter L on the second side X2 in the route extension direction) to return to the first travel floor F1. The returned transport vehicle 1 receives, similar to the above-described procedure, articles G in the work area WA (article supply section 2) and transports the articles G to the sorting area SA (article reception section 3).

FIG. 3 shows a state in which the transport vehicle 1 move between the levels in one transport unit U. As shown in FIG. 3, the travel route R of the first travel floor F1 and the travel route R of the second travel floor F2 are parallel to each other, and the directions in which the transport vehicle 1 is allowed to travel along the travel routes are set to be oriented opposite to each other in the route extension direction X. In the shown example, the transport vehicle 1 is configured to travel along the travel route R on the first travel floor F1 toward the first side X1 in the route extension direction. The transport vehicle 1 is also configured to travel along the travel route R on the second travel floor F2 toward the second side X2 in the route extension direction.

Each lifter L includes a lifting platform La on which the transport vehicle 1 can be placed. Each lifter L lifts and lowers the transport vehicle 1 over multiple levels with the transport vehicle 1 placed on the lifting platform La of the lifter L. Each lifter L is configured to lift and lower the lifting platform La while maintaining the lifting platform La to be oriented along the horizontal plane (for example, to be parallel to the horizontal plane).

In the present embodiment, each lifter L is provided with a plurality of lifting platforms La. The lifter L is configured to cause the plurality of lifting platforms La to circulate along a predetermined circular route.

In the present embodiment, the lifter L connected to one end in the travel route R is set as a lifter for lifting the transport vehicle 1. This lifter L functions to move the transport vehicle 1 from the first travel floor F1 to the second travel floor F2. The lifter L connected to the other end of the travel route R is set as a lifter for lowering the transport vehicle 1. This lifter L functions to move the transport vehicle 1 from the second travel floor F2 to the first travel floor F1. As shown in FIG. 1, in this example, the first lifter L1, the third lifter L3, and the fifth lifter L5 are set as the lifters for lifting the transport vehicle 1. Also, the second lifter L2, the fourth lifter L4, and the sixth lifter L6 are set as lifters for lowering the transport vehicle 1.

As described above, in the present embodiment, the first travel floor F1 has the work area WA (article supply section 2) in which the transport vehicle 1 receives articles G, and the sorting area SA (article reception section 3) to which the transport vehicle 1 delivers articles G. In this example, the transport vehicle 1 exits from the exit of the lowering lifter L (in this example, the second lifter L2, the fourth lifter L4, or the sixth lifter L6) to the first travel floor F1 and receives articles G in the work area WA. Then, the transport vehicle 1 travels along the travel route R on the first travel floor F1 toward the first side X1 of the route extension direction while holding the articles G, and delivers the articles G in the sorting area SA. Thereafter, the transport vehicle 1 rides the lifting lifter L (in this example, the first lifter L1, the third lifter L3, or the fifth lifter L5) and moves from the first travel floor F1 to the second travel floor F2. The transport vehicle 1 exits from the exit of the lifting lifter L to the second travel floor F2, and travels along the travel route R on the second travel floor F2 toward the second side X2 of the route extension direction. Then, the transport vehicle 1 rides the lowering lifter L, and moves again to the first travel floor F1. In this way, the transport vehicle 1 circulates between the first travel floor F1 and the second travel floor F2.

Figure 4:
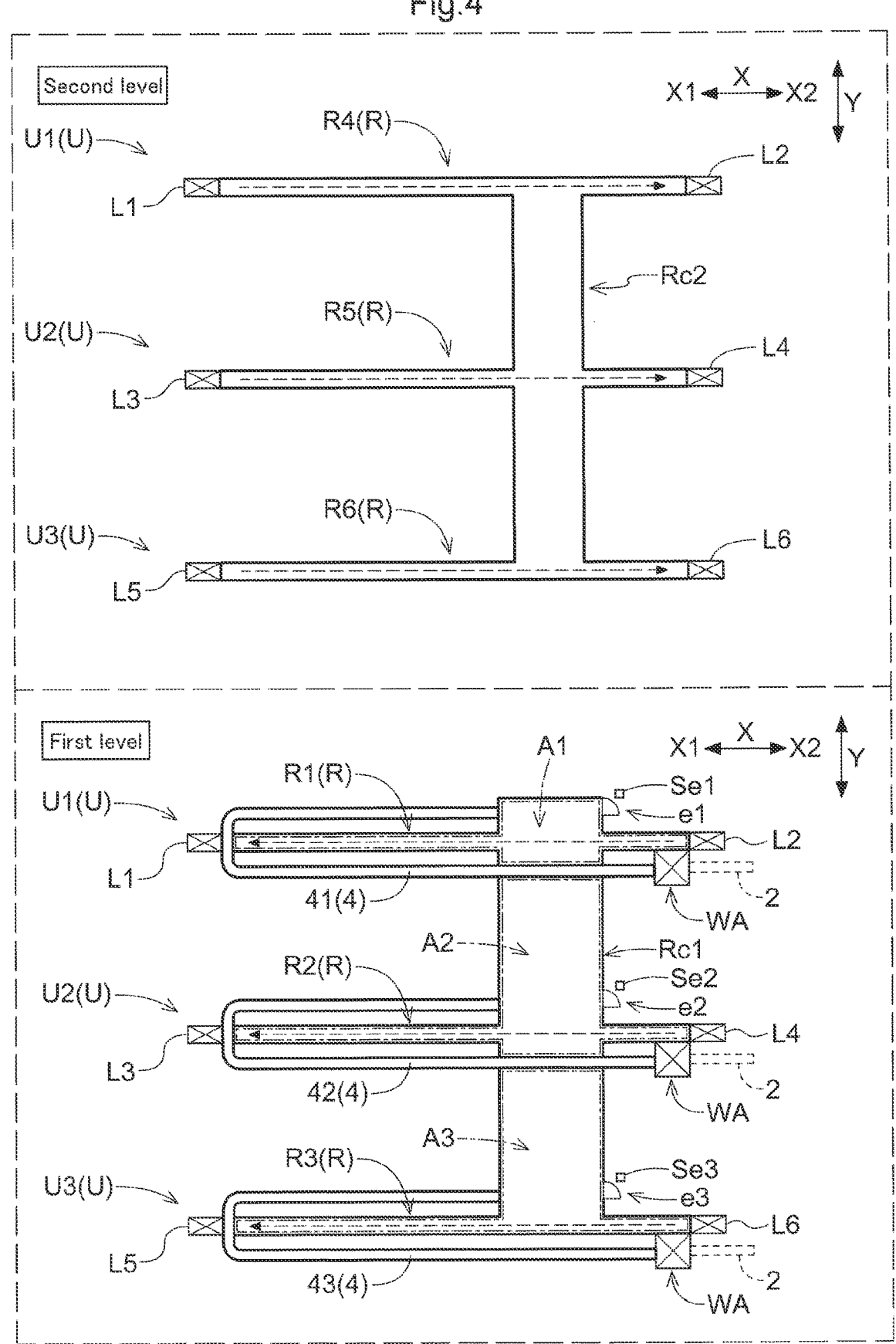
FIG. 4 is a schematic plan view illustrating the article transport facility.

FIG. 4 is a schematic plan view illustrating the entire article transport facility 100. In FIG. 4, elements that are not essential for the following description are omitted, or even elements essential for the description are shown in a simplified manner. The same applies to FIGS. 5 to 7.

As shown in FIG. 4, in the present embodiment, the first travel route R1 on the first travel floor F1 is a route in which only one-way traffic from the second lifter L2 to the first lifter L1 is allowed. In the first travel route R1, the transport vehicle 1 is allowed only to travel from the second lifter L2 to the first lifter L1. Note however that the transport vehicle 1 can leave the first travel route R1 during the travel along the first travel route R1, and can travel along the first connection route Rc1. In the shown example, the first travel route R1 allows the travel of the transport vehicle 1 from the second side X2 in the route extension direction to the first side X1 in the route extension direction. The travel of the transport vehicle 1 in the opposite direction is prohibited.

In the present embodiment, the fourth travel route R4 on the second travel floor F2 is a route in which only one-way traffic from the first lifter L1 to the second lifter L2 is allowed. In the fourth travel route R4, the transport vehicle 1 is allowed only to travel from the first lifter L1 to the second lifter L2. Note however that the transport vehicle 1 can leave the fourth travel route R4 during the travel along the fourth travel route R4, and can travel along the second connection route Rc2. In the shown example, the fourth travel route R4 allows the travel of the transport vehicle 1 from the first side X1 in the route extension direction to the second side X2 in the route extension direction. The travel of the transport vehicle 1 in the opposite direction is prohibited.

In the present embodiment, the second travel route R2 on the first travel floor F1 is a route in which only one-way traffic from the fourth lifter L4 to the third lifter L3 is allowed. In the second travel route R2, the transport vehicle 1 is allowed only to travel from the fourth lifter L4 to the third lifter L3. Note however that the transport vehicle 1 can leave the second travel route R2 during the travel along the second travel route R2, and can travel along the first connection route Rc1. In the shown example, the first travel route R2 allows the travel of the transport vehicle 1 from the second side X2 in the route extension direction to the first side X1 in the route extension direction. The travel of the transport vehicle 1 in the opposite direction is prohibited.

In the present embodiment, the fifth travel route R5 on the second travel floor F2 is a route in which only one-way traffic from the third lifter L3 to the fourth lifter L4 is allowed. In the fifth travel route R5, the transport vehicle 1 is allowed only to travel from the third lifter L3 to the fourth lifter L4. Note however that the transport vehicle 1 can leave the fifth travel route R5 during the travel along the fifth travel route R5, and can travel along the second connection route Rc2. In the shown example, the fifth travel route R5 allows the travel of the transport vehicle 1 from the first side X1 in the route extension direction to the second side X2 in the route extension direction. The travel of the transport vehicle 1 in the opposite direction is prohibited.

In the present embodiment, the third travel route R3 on the first travel floor F1 is a route in which only one-way traffic from the sixth lifter L6 to the fifth lifter L5 is allowed. In the third travel route R3, the transport vehicle 1 is allowed only to travel from the sixth lifter L6 to the fifth lifter L5. Note however that the transport vehicle 1 can leave the third travel route R3 during the travel along the third travel route R3, and can travel along the first connection route Rc1. In the shown example, the third travel route R3 allows the travel of the transport vehicle 1 from the second side X2 in the route extension direction to the first side X1 in the route extension direction. The travel of the transport vehicle 1 in the opposite direction is prohibited.

In the present embodiment, the sixth travel route R6 on the second travel floor F2 is a route in which only one-way traffic from the fifth lifter L5 to the sixth lifter L6 is allowed. In the sixth travel route R6, the transport vehicle 1 is allowed only to travel from the fifth lifter L5 to the sixth lifter L6. Note however that the transport vehicle 1 can leave the sixth travel route R6 during travel along the sixth travel route R6, and can travel along the second connection route Rc2. In the shown example, the sixth travel route R6 allows the travel of the transport vehicle 1 from the first side X1 in the route extension direction to the second side X2 in the route extension direction. The travel of the transport vehicle 1 in the opposite direction is prohibited.

In the present embodiment, the first connection route Rc1 and the second connection route Rc2 are routes in which there is no restriction on the direction of travel of the transport vehicle 1. In other words, in each of the first connection route Rc1 and the second connection route Rc2, the transport vehicle 1 can travel along both the route extension direction X and the route width direction Y. When traveling in the route extension direction X on the first connection route Rc1 and the second connection route Rc2, the transport vehicle 1 can travel toward both the first side X1 in the route extension direction and the second side X2 in the route extension direction.

In this way, the direction in which the transport vehicle 1 can travel is set for each travel route R. Therefore, in each travel route R, "upstream side" and "downstream side" are defined on the basis of the direction in which the transport vehicle 1 can travel.

In the present embodiment, the article supply sections 2 are respectively adjacent to sections of the first travel route R1, the second travel route R2, and the third travel route R3 located upstream of the first connection route Rc1.

On the first travel floor F1, a first area A1 that includes the first travel route R1 but does not include the second travel route R2 and the third travel route R3, a second area A2 that includes the second travel route R2 but does not include the first travel route R1 and the third travel route R3, and a third area A3 that includes the third travel route R3 but does not include the first travel route R1 and the second travel route R2 are set.

In the present embodiment, the first area A1 and the second area A2 are separated from each other by the first conveyor 41. The second area A2 and the third area A3 are separated from each other by the second conveyor 42. In more detail, the first connection route Rc1 includes part of the first area A1, part of the second area A2, and part of the third area A3. When viewed in the up-down direction, the first conveyor 41 serves as the boundary between the first area A1 and the second area A2 in the first connection route Rc1. When viewed in the up-down direction, the second conveyor 42 serves as the boundary between the second area A2 and the third area A3 in the first connection route Rc1. Note that each of the areas A1 to A3 includes, in addition to the corresponding portion set in the first connection route Rc1, the following portion. That is, as described above, the first area A1 also includes the entire first travel route R1, the second area A2 also includes the entire second travel route R2, and the third area A3 also includes the entire third travel route R3.

Although detailed illustrations are omitted, the first conveyor 41 and the second conveyor 42 are spaced from the travel surface Ff of the first travel floor F1. The transport vehicle 1 traveling on the first travel floor F1 is able to pass below the first conveyor 41 and the second conveyor 42. On the other hand, the gaps between the first conveyor 41 and the travel surface Ff of the first travel floor F1, and between the second conveyor 42 and the travel surface Ff of the first travel floor F1 are not sufficient for a worker W to pass therethrough. Therefore, the transport vehicle 1 can travel on the first connection route Rc1 to move between the areas A1 to A3, but the worker W cannot move between the areas A1 to A3 on the first connection route Rc1 due to the presence of the first conveyor 41 and the second conveyor 42.

In the present embodiment, the first travel floor F1 includes a first entrance e1 for the worker W to enter the first area A1, a second entrance e2 for the worker W to enter the second area A2, and a third entrance e3 for the worker W to enter the third area A3.

Here, the control device M (see FIG. 2) is configured to be able to set any of the first area A1, the second area A2, and the third area A3 to a travel prohibition area in which the travel of the transport vehicle 1 is prohibited. In the present embodiment, the control device M is configured to detect the entry of a worker W, and sets the area for which the entry of the worker W has been detected to the travel prohibition area. In the present embodiment, the control device M detects whether or not the worker W has entered the first area A1 based on the open/close status of the first entrance e1. Also, the control device M detects whether or not the worker W enters the second area A2 based on the open/close status of the second entrance e2. Also, the control device M detects whether or not the worker W enters the third area A3 based on the open/close status of the third entrance e3. In the shown example, a first sensor Se1 for detecting opening of the first entrance e1, a second sensor Se2 for detecting opening of the second entrance e2, and a third sensor Se3 for detecting opening of the third entrance e3 are provided. The control device M detects whether or not a worker W enters any of the areas A1 to A3 based on the results of detections by the sensors Se1 to Se3.

The control device M is configured to prohibit or allow travel of the transport vehicle 1 for the plurality of areas A1 to A3, based on whether or not the worker W has entered any one of the plurality of areas A1 to A3.

Figure 5:
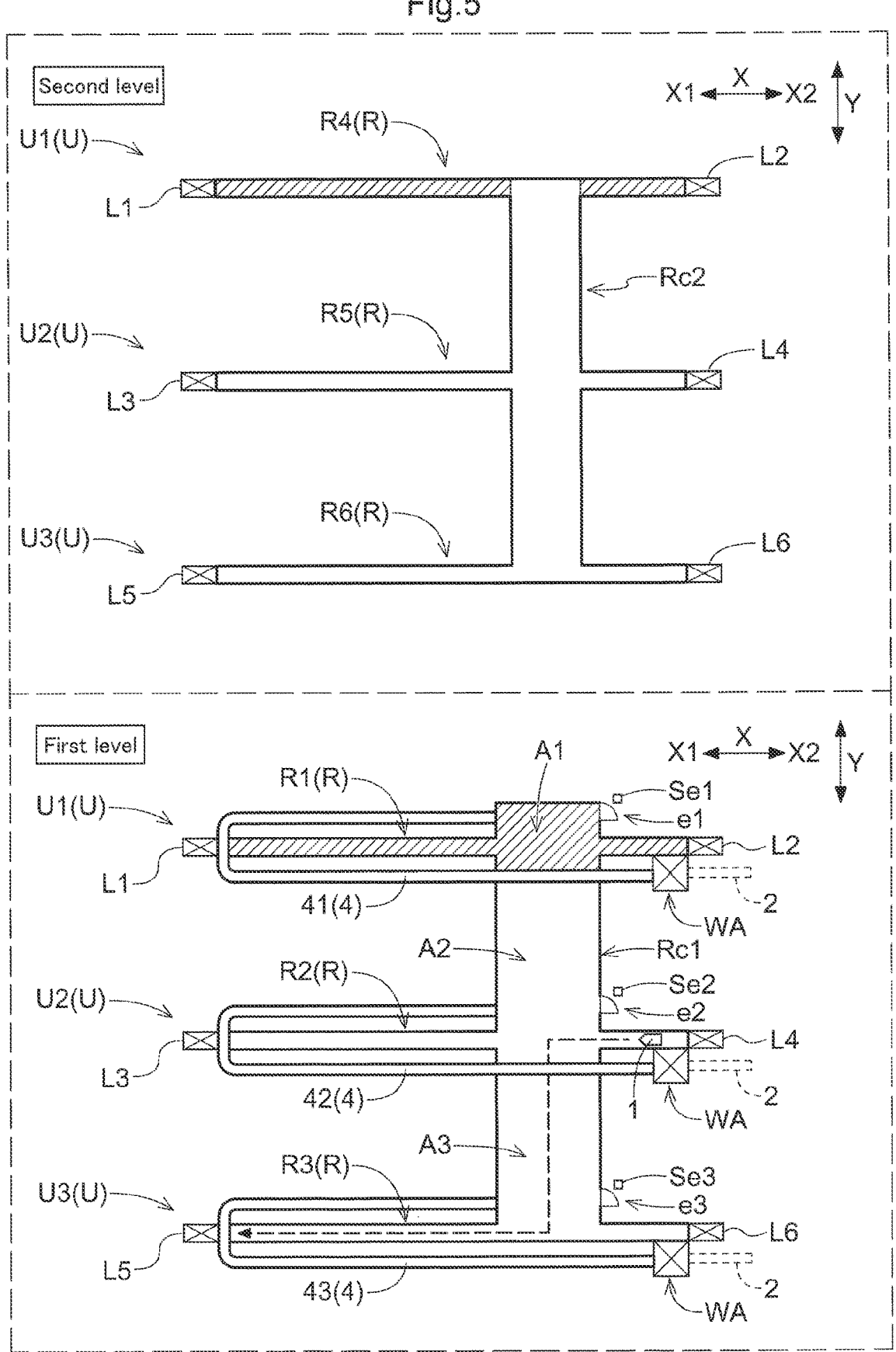
FIG. 5 is a plan view illustrating a case where travel is prohibited in a first area.

FIG. 5 shows a case where the worker W has entered the first area A1.

As shown in FIG. 5, when the entry of the worker W into the first area A1 has been detected, the control device M prohibits the travel of the transport vehicle 1 in the first area A1, but allows the travel of the transport vehicle 1 in the second area A2 and the third area A3. In the present embodiment, when the entry of the worker W into the first area A1 has been detected, the control device M also prohibits the travel of the transport vehicle 1 in the fourth travel route R4 on the second travel floor F2 (however, travel in the overlapping area with the fourth travel route R4 in the second connection route Rc2 is allowed). With this, in the above-described case, it is possible to prevent such a situation in which the transport vehicle 1 rides, by mistake, the second lifter L2 from the second travel floor F2 to move to the first area A1 (specifically, the first travel route R1) on the first travel floor F1.

In the example shown in FIG. 5, the transport vehicle 1 is allowed to travel in the second area A2 and the third area A3. Accordingly, the transport vehicle 1 can move between the second area A2 and the third area A3. For example, as shown in FIG. 5, the transport vehicle 1 can travel from the second travel route R2 in the second area A2 to the third travel route R3 in the third area A3 via the first connection route Rc1.

Figure 6:
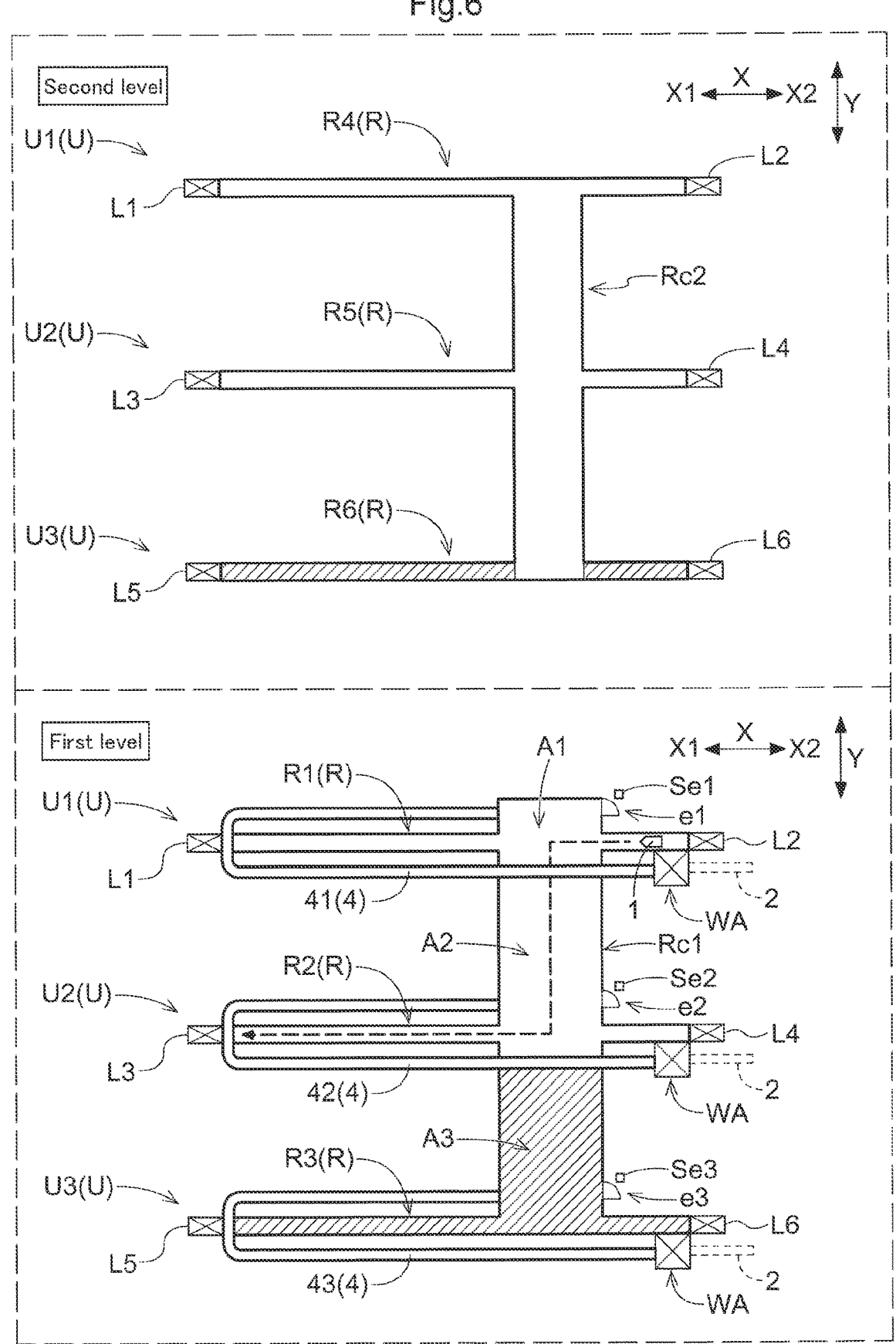
FIG. 6 is a plan view illustrating a case where travel is prohibited in a third area.

FIG. 6 shows a case where the worker W has entered the third area A3.

As shown in FIG. 6, when the entry of the worker W into the third area A3 has been detected, the control device M prohibits the travel of the transport vehicle 1 in the third area A3, but allows the travel of the transport vehicle 1 in the first area A1 and the second area A2. In the present embodiment, when the entry of the worker W into the third area A3 has been detected, the control device M also prohibits the travel of the transport vehicle 1 in the sixth travel route R6 on the second travel floor F2 (however, travel in the overlapping area with the sixth travel route R6 in the second connection route Rc2 is allowed). With this, in the above-described case, it is possible to prevent such a situation in which the transport vehicle 1 rides, by mistake, the sixth lifter L6 from the second travel floor F2 to move to the third area A3 (specifically, the third travel route R3) on the first travel floor F1.

In the example shown in FIG. 6, the transport vehicle 1 is allowed to travel in the first area A1 and the second area A2. Accordingly, the transport vehicle 1 can move between the first area A1 and the second area A2. For example, as shown in FIG. 6, the transport vehicle 1 can travel from the first travel route R1 in the first area A1 to the second travel route R2 in the second area A2 via the first connection route Rc1.

Figure 7:
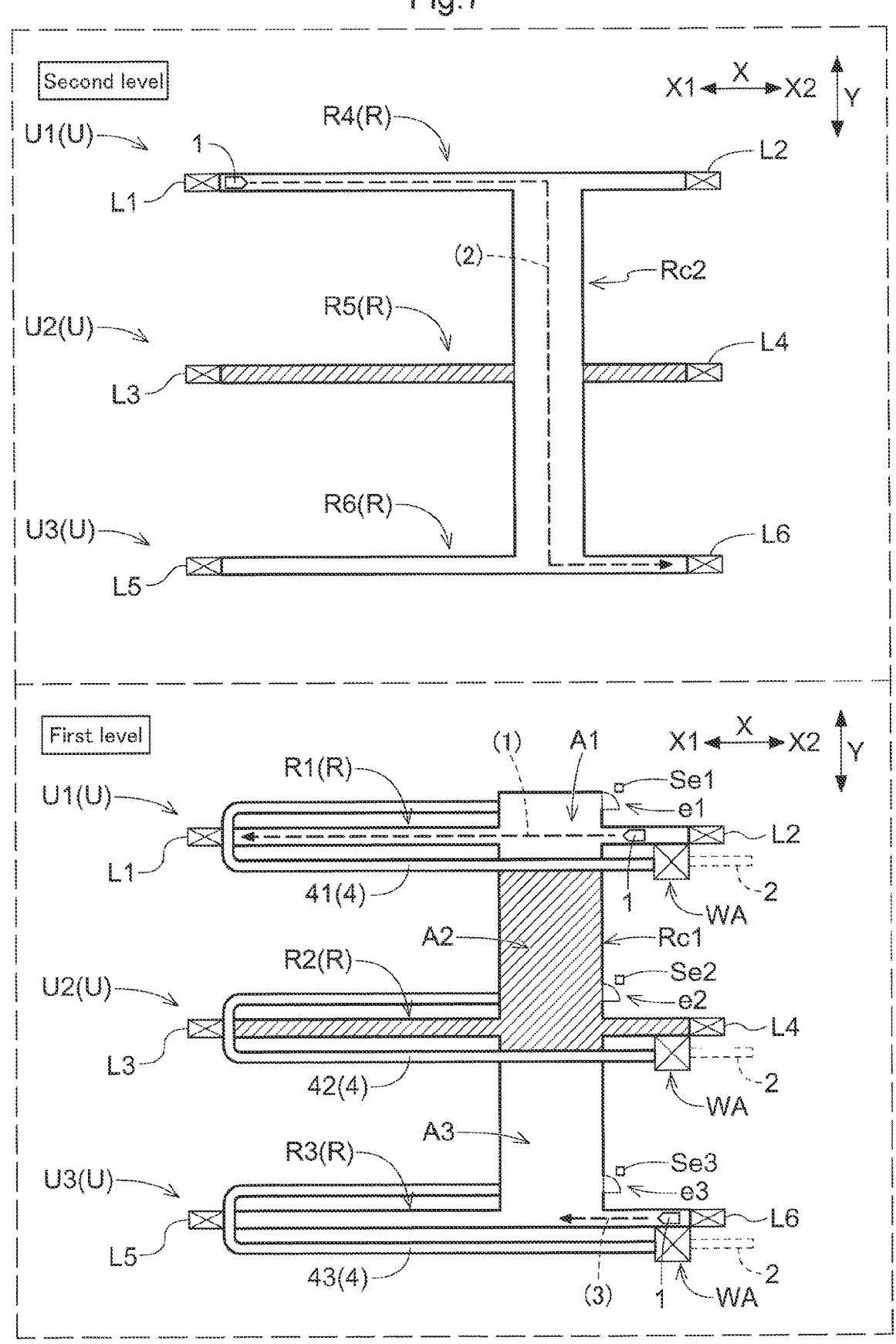
FIG. 7 is a plan view illustrating a case where travel is prohibited in a second area.

FIG. 7 shows a case where the worker W has entered the second area A2.

As shown in FIG. 7, when the entry of the worker W into the second area A2 has been detected, the control device M prohibits the travel of the transport vehicle 1 in the second area A2, but allows the travel of the transport vehicle 1 in the first area A1 and the third area A3. In the present embodiment, when the entry of the worker W into the second area A2 has been detected, the control device M also prohibits the travel of the transport vehicle 1 in the fifth travel route R5 on the second travel floor F2 (however, travel in the overlapping area with the fifth travel route R5 in the second connection route Rc2 is allowed). With this, in the above-described case, it is possible to prevent such a situation in which the transport vehicle 1 rides, by mistake, the fourth lifter L4 from the second travel floor F2 to move to the second area A2 (specifically, the second travel route R2) on the first travel floor F1.

When the second area A2 located between the first area A1 and the third area A3 is set to the travel prohibition area, the transport vehicle 1 cannot move between the first area A1 and the third area A3 on the first travel floor F1. Accordingly, when the travel in the second area A2 is prohibited, the transport vehicle 1 moves between the first area A1 and the third area A3 via the second connection route Rc2 on the second travel floor F2.

Furthermore, in the present embodiment, each of the travel routes R has any restriction on the direction in which the transport vehicle 1 can travel. Accordingly, when the travel in the second area A2 is prohibited, the transport vehicle 1 moves from the first area A1 to the third area A3, by traveling the first travel route R1, the first lifter L1, the fourth travel route R4, the second connection route Rc2, the sixth travel route R6, and the sixth lifter L6 in the stated order. Although detailed illustrations are omitted, when the travel in the second area A2 is prohibited, the transport vehicle 1 moves from the third area A3 to the first area A1, by traveling the third travel route R3, the fifth lifter L5, the sixth travel route R6, the second connection route Rc2, the fourth travel route R4, and the second lifter L2 in the stated order.

For example, FIG. 7 shows a route in which, when the travel in the second area A2 is prohibited, the transport vehicle 1 moves from the first area A1 to the third area A3:

(1) Upon receiving articles G from the article supply section 2 on the first travel route R1, the transport vehicle 1 travels on the first travel route R1 to the first side X1 in the route extension direction, and rides the first lifter L1 to move to the second travel floor F2.

(2) The transport vehicle 1 gets off from the first lifter L1 on the second travel floor F2, and travels on the fourth travel route R4 toward the second side X2 in the route extension direction. Then, the transport vehicle 1 travels on the second connection route Rc2 toward the sixth travel route R6. The transport vehicle 1 travels on the sixth travel route R6 to the second side X2 in the route extension direction, and rides the sixth lifter L6 to move to the first travel floor F1.

(3) The transport vehicle 1 gets off from the sixth lifter L6 on the first travel floor F1. In the present embodiment, the location at which the transport vehicle 1 gets off from the sixth lifter L6 is the third travel route R3 in the third area A3.

With the above-described items (1) to (3), the transport vehicle 1 can move from the first area A1 to the third area A3 even if the travel in the second area A2 is prohibited.

Other Embodiments

The following will describe other embodiments of the article transport facility.

(1) The above-described embodiment has described an example in which each of the travel routes R has any restriction on the direction in which the transport vehicle 1 can travel. However, the present invention is not limited to such an example, and each of the travel routes R does not need to have any restriction on the direction in which the transport vehicle 1 can travel.

(2) The above-described embodiment has described an example in which the article supply sections 2 are respectively adjacent to sections of the first travel route R1, the second travel route R2, and the third travel route R3 located upstream of the first connection route Rc1. However, the present invention is not limited to such an example, and a configuration is also possible in which the article supply sections 2 are provided in sections thereof on the downstream side of the first connection route Rc1.

(3) The above-described embodiment has described an example in which the first area A1 and the second area A2 are separated from each other by the first conveyor 41, and the second area A2 and the third area A3 are separated from each other by the second conveyor 42. However, the present invention is not limited to such an example, and a configuration is also possible in which the first area A1, the second area A2, and the third area A3 are separated from each other by virtual lines, without relying on existing materials such as conveyors. In this case, the article transport facility 100 does not need to include any of the first conveyor 41 and the second conveyor 42.

(4) The above-described embodiment has described an example in which the control device M detects whether or not a worker W enters one of the areas A1 to A3 based on the results of detection by the sensors Se1 to Se3 provided at the respective entrances e1 to e3. However, the present invention is not limited to such an example, and a configuration is also possible in which, for example, cameras for monitoring the respective areas A1 to A3 are provided, and the control device M detects whether or not a worker W enters one of the areas A1 to A3 based on images captured by the cameras.

(5) The above-described embodiment has described an example in which the control device M is configured to detect the entry of a worker W, and sets the area for which the entry of the worker W has been detected to a travel prohibition area. However, the present invention is not limited to such an example, and a configuration is also possible in which, for example, a worker W designates one of the plurality of areas A1 to A3 to the travel prohibition area, by performing terminal operation or the like. In this case, the control device M sets the area designated by the worker W to the travel prohibition area.

(6) Note that the configuration disclosed in the above embodiment can also be applied in combination with configurations disclosed in other embodiments as long as no contradiction arises. Regarding other configurations as well, the embodiment disclosed in the present specification is merely an example in all respects. Accordingly, various modifications can be made as appropriate without departing from the gist of the present disclosure.

Overview of the Embodiments

The following will describe the article transport facility explained above.

An article transport facility including:

a transport vehicle configured to transport articles;

a first travel floor and a second travel floor on which the transport vehicle is travelable;

a plurality of lifters configured to lift and lower the transport vehicle between the first travel floor and the second travel floor; and a control device configured to control transport of the articles, wherein the plurality of lifters include a first lifter, a second lifter, a third lifter, a fourth lifter, a fifth lifter, and a sixth lifter that are horizontally spaced from each, the article transport facility includes, on the first travel floor, a first travel route connecting the first lifter and the second lifter, a second travel route connecting the third lifter and the fourth lifter, a third travel route connecting the fifth lifter and the sixth lifter, and a first connection route, the first travel route, the second travel route, and the third travel route being arranged in parallel, and the first connection route including a section connecting the first travel route and the second travel route, and a section connecting the second travel route and the third travel route, the article transport facility includes, on the second travel floor, a fourth travel route connecting the first lifter and the second lifter, a fifth travel route connecting the third lifter and the fourth lifter, a sixth travel route connecting the fifth lifter and the sixth lifter, and a second connection route, the fourth travel route, the fifth travel route, and the sixth travel route being arranged in parallel, and the second connection route including a section connecting the fourth travel route and the fifth travel route, and a section connecting the fifth travel route and the sixth travel route, the article transport facility has, on the first travel floor, a first area that includes the first travel route but does not include the second travel route and the third travel route, a second area that includes the second travel route but does not include the first travel route and the third travel route, and a third area that includes the third travel route but does not include the first travel route and the second travel route, the control device is configured to set each of the first area, the second area, and the third area to a travel prohibition area in which travel of the transport vehicle is prohibited, in response to the first area being set to the travel prohibition area, the control device prohibits the transport vehicle from traveling in the first area but allows the transport vehicle to travel in the second area and the third area, in response to the third area being set to the travel prohibition area, the control device prohibits the transport vehicle from traveling in the third area but allows the transport vehicle to travel in the first area and the second area, in response to the second area being set to the travel prohibition area, the control device prohibits the transport vehicle from traveling in the second area but allows the transport vehicle to travel in the first area and the third area, and while the transport vehicle is prohibited from traveling in the second area, the transport vehicle moves between the first area and the third area via the second connection route on the second travel floor.

With this configuration, even if any one of the first area, the second area, and the third area provided on the first travel floor is set to a travel prohibition area, it is possible to realize the movement of the transport vehicle between two other areas. That is to say, when the first area is set to the travel prohibition area, the transport vehicle can move between the second area and the third area via the first connection route. When the third area is set to the travel prohibition area, the transport vehicle can move between the first area and the second area via the first connection route. Also, when the second area located in the center is set to the travel prohibition area, the transport vehicle can move between the first area and the third area via the second connection route on the second travel floor. Accordingly, this configuration enables a transport vehicle to appropriately move between a plurality of areas other than a travel prohibition area.

Preferably, the control device is configured to detect entry of a worker into any one of the first area, the second area, and the third area, and set the area for which the entry of the worker has been detected to the travel prohibition area.

With this configuration, the entry of a worker is a condition for setting a travel prohibition area. It is easy to ensure the safety of the worker when he or she enters an area, for example, during maintenance.

Preferably, the first travel route is a route in which only one-way traffic from the second lifter to the first lifter is allowed, the fourth travel route is a route in which only one-way traffic from the first lifter to the second lifter is allowed, the second travel route is a route in which only one-way traffic from the fourth lifter to the third lifter is allowed, the fifth travel route is a route in which only one-way traffic from the third lifter to the fourth lifter is allowed, the third travel route is a route in which only one-way traffic from the sixth lifter to the fifth lifter is allowed, the sixth travel route is a route in which only one-way traffic from the fifth lifter to the sixth lifter is allowed, and while travel in the second area is prohibited, the transport vehicle moves from the first area to the third area by moving along the first travel route, the first lifter, the fourth travel route, the second connection route, the sixth travel route, and the sixth lifter in this order.

With this configuration, even if each of the travel routes has any restriction on the direction in which the transport vehicle can travel, it is possible to allow a transport vehicle to appropriately move between a plurality of areas other than a travel prohibition area.

Preferably, the article transport facility further includes article supply sections for supplying the articles to be transported by the transport vehicle, wherein the article supply sections are respectively adjacent to sections of the first travel route, the second travel route, and the third travel route located upstream of the first connection route.

With this configuration, the transport vehicle can receive articles to be transported on the upstream side of the first connecting route. Accordingly, the transport vehicle can determine whether or not to move to another travel route through the first connection route while holding the articles. Therefore, according to this configuration, it is possible to increase the number of options for the transport destination of the articles.

Preferably, a first conveyor and a second conveyor in a space in an up-down direction between the first travel floor and the second travel floor, the first conveyor being provided between the first travel route and the second travel route while extending along the first travel route, and the second conveyor being provided between the second travel route and the third travel route while extending along the second travel route, the first area and the second area are separated from each other by the first conveyor, and the second area and the third area are separated from each other by the second conveyor.

With this configuration, the first to third areas can be separated from each other on the basis of the first conveyor and the second conveyor. Accordingly, the boundaries of the first to third areas are easy to visually identify. Also, typically, conveyors are designed in such a manner that workers are prohibited from crossing over them or are unable to cross over them. Thus, it is possible to prevent workers who have entered a travel prohibition area from entering other areas in which travel of the transport vehicle is not prohibited.

INDUSTRIAL APPLICABILITY

The present invention is applicable to an article transport facility provided with a transport vehicle that transports articles.

What is claimed is:

1. An article transport facility comprising:

a transport vehicle configured to transport articles;

a first travel floor and a second travel floor on which the transport vehicle is travelable;

a plurality of lifters configured to lift and lower the transport vehicle between the first travel floor and the second travel floor; and a control device configured to control transport of the articles, and wherein:

the plurality of lifters comprise a first lifter, a second lifter, a third lifter, a fourth lifter, a fifth lifter, and a sixth lifter that are horizontally spaced from each, the article transport facility comprises, on the first travel floor, a first travel route connecting the first lifter and the second lifter, a second travel route connecting the third lifter and the fourth lifter, a third travel route connecting the fifth lifter and the sixth lifter, and a first connection route, the first travel route, the second travel route, and the third travel route being arranged in parallel, and the first connection route comprising a section connecting the first travel route and the second travel route, and a section connecting the second travel route and the third travel route, the article transport facility comprises, on the second travel floor, a fourth travel route connecting the first lifter and the second lifter, a fifth travel route connecting the third lifter and the fourth lifter, a sixth travel route connecting the fifth lifter and the sixth lifter, and a second connection route, the fourth travel route, the fifth travel route, and the sixth travel route being arranged in parallel, and the second connection route comprising a section connecting the fourth travel route and the fifth travel route, and a section connecting the fifth travel route and the sixth travel route, the article transport facility has, on the first travel floor, a first area that includes the first travel route but does not include the second travel route and the third travel route, a second area that includes the second travel route but does not include the first travel route and the third travel route, and a third area that includes the third travel route but does not include the first travel route and the second travel route, the control device is configured to set each of the first area, the second area, and the third area to a travel prohibition area in which travel of the transport vehicle is prohibited, in response to the first area being set to the travel prohibition area, the control device prohibits the transport vehicle from traveling in the first area but allows the transport vehicle to travel in the second area and the third area, in response to the third area being set to the travel prohibition area, the control device prohibits the transport vehicle from traveling in the third area but allows the transport vehicle to travel in the first area and the second area, in response to the second area being set to the travel prohibition area, the control device prohibits the transport vehicle from traveling in the second area but allows the transport vehicle to travel in the first area and the third area, and while travel in the second area is prohibited, the transport vehicle moves between the first area and the third area via the second connection route on the second travel floor.

2. The article transport facility according to claim 1, wherein the control device is configured to detect entry of a worker into any one of the first area, the second area, and the third area, and set the area for which the entry of the worker has been detected to the travel prohibition area.

3. The article transport facility according to claim 1, wherein:

the first travel route is a route in which only one-way traffic from the second lifter to the first lifter is allowed, the fourth travel route is a route in which only one-way traffic from the first lifter to the second lifter is allowed, the second travel route is a route in which only one-way traffic from the fourth lifter to the third lifter is allowed, the fifth travel route is a route in which only one-way traffic from the third lifter to the fourth lifter is allowed, the third travel route is a route in which only one-way traffic from the sixth lifter to the fifth lifter is allowed, the sixth travel route is a route in which only one-way traffic from the fifth lifter to the sixth lifter is allowed, and while travel in the second area is prohibited, the transport vehicle moves from the first area to the third area by moving along the first travel route, the first lifter, the fourth travel route, the second connection route, the sixth travel route, and the sixth lifter in this order.

4. The article transport facility according to claim 3, further comprising:

article supply sections for supplying the articles to be transported by the transport vehicle, and wherein the article supply sections are respectively adjacent to sections of the first travel route, the second travel route, and the third travel route located upstream of the first connection route.

5. The article transport facility according to claim 1, further comprising:

a first conveyor and a second conveyor in a space in an up-down direction between the first travel floor and the second travel floor, the first conveyor being provided between the first travel route and the second travel route while extending along the first travel route, and the second conveyor being provided between the second travel route and the third travel route while extending along the second travel route, wherein the first area and the second area are separated from each other by the first conveyor, and wherein the second area and the third area are separated from each other by the second conveyor.

* * * * *